(12) United States Patent
Hirata et al.

(10) Patent No.: US 6,938,082 B2
(45) Date of Patent: *Aug. 30, 2005

(54) METHOD FOR CONTROLLING MANAGING COMPUTER, MEDIUM FOR STORING CONTROL PROGRAM, AND MANAGING COMPUTER

(75) Inventors: Toshiaki Hirata, Kashiwa (JP); Akihiro Urano, Fujisawa (JP); Shuji Fujino, Ebina (JP); Toshio Sato, Fujisawa (JP); Norio Yamamura, Yokohama (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 09/793,970

(22) Filed: Feb. 28, 2001

(65) Prior Publication Data

US 2001/0054094 A1 Dec. 20, 2001

Related U.S. Application Data

(63) Continuation of application No. 09/179,091, filed on Oct. 27, 1998, now Pat. No. 6,219,701.

(30) Foreign Application Priority Data

Oct. 27, 1997 (JP) .......................................... 09-294030

(51) Int. Cl.⁷ ....................... G06F 15/173; G06F 15/167
(52) U.S. Cl. ........................ 709/224; 709/223; 709/213
(58) Field of Search ................................. 709/223, 224, 709/229, 103, 213

(56) References Cited

U.S. PATENT DOCUMENTS

| | | | |
|---|---|---|---|
| 4,323,966 A | * | 4/1982 | Whiteside et al. .......... 709/103 |
| 5,619,655 A | | 4/1997 | Weng et al. ................. 709/226 |
| 5,642,508 A | | 6/1997 | Miyazawa ................... 709/104 |
| 5,655,081 A | * | 8/1997 | Bonnell et al. ............. 709/223 |
| 5,729,472 A | | 3/1998 | Seiffert et al. .......... 709/224 X |
| 5,748,884 A | | 5/1998 | Royce et al. .................. 714/57 |
| 5,867,716 A | * | 2/1999 | Morimoto et al. .......... 709/223 |
| 5,872,970 A | | 2/1999 | Pickett et al. ............... 709/101 |
| 5,893,905 A | | 4/1999 | Main et al. ............. 709/224 X |
| 6,023,507 A | | 2/2000 | Wookey ................. 714/805 X |
| 6,085,244 A | * | 7/2000 | Wookey ...................... 709/224 |
| 6,327,623 B2 | * | 12/2001 | Watts ........................ 709/229 |

FOREIGN PATENT DOCUMENTS

| | | |
|---|---|---|
| JP | 63293650 | 11/1988 |
| JP | 127352 | 4/1992 |
| JP | 147362 | 6/1996 |
| JP | 272711 | 10/1996 |

OTHER PUBLICATIONS

Job Management Partner 1/Automatic Job Schedular, Description and User's Guide, Hitachi, Ltd., Apr. 1997.

(Continued)

*Primary Examiner*—Patrice Winder
(74) *Attorney, Agent, or Firm*—Antonelli, Terry, Stout & Kraus, LLP

(57) ABSTRACT

A managing computer is provided having an acquiring device for acquiring log information and event information from among a plurality of computers connected via a network to each other into a common database of the managing computer. A data controller may be provided for storing into the common database of the managing computer, operation definition information used to define a schedule of process operations executed in the plurality of computers in relation to the log information and the event information acquired by the acquiring device. A display device may display the operation definition information in relation to event information related to a process operation defined by the operation defining information with reference to the information stored in the database.

13 Claims, 12 Drawing Sheets

OTHER PUBLICATIONS

Dale H. Leschnitzer, What is LSF?, Los Alamos National Laboratory, http://saaz.lanl.gov/:LSF/, Sep. 1996, 5 pages.

LSF User's Guide—Chapter 1. Introduction, Platform Computing Corp., http://aauwww.uni–c.dk/lsf, Jan. 1997, 9 pages.

LSF JobSchedular User's Guide—Chapter 1–3, 7, Platform Computing Corp., http://aauwww.uni–c.dk/lsf/, Jan. 1997, 29 pages.

LSF Batch Administrator's Guide, Chapter 3. Managing LSF Batch, http://www.uni–bielefeld.de/hrz/unix/lsf/admin/ Jan. 1998, 28 pages.

The Network and Systems Management Listing, Data Communications Networking Directory Issue, Aug. 21, 1997, pp. 164–173.

* cited by examiner

FIG.6

701 OPERATION DEFINITION INFORMATION

710

DEFINITION SUBJECT : default

POWER SUPPLY CONTROL :

711 TURN ON POWER SUPPLY :
    DESIGNATED DAY           : MONDAY TO FRIDAY
    DESIGNATED TIME INSTANT  : 8:30

TURN OFF POWER SUPPLY :
    DESIGNATED DAY           : MONDAY TO FRIDAY
    DESIGNATED TIME INSTANT  : 19:30
    END PLAN                 : WAIT FOR END OF JOB UNDER EXECUTION

JOB EXECUTION CONTROL :

712 JOB NET A : JOB A1 , { JOB A21, JOB A22 } , JOB A3

DESIGNATED DAY           : MONDAY TO FRIDAY
    DESIGNATED TIME INSTANT  : 12:00
    JOB A21                  :

JOB SORT    : SUBMITJOB
        JUDGE END   : CONTINUOUSLY NORMAL
        SET IN DETAIL  : --------------------

FIG.7A

801 OPERATION DEFINITION INFORMATION

```
DEFINITION SUBJECT : COMPUTER A,B

POWER SUPPLY CONTROL :

TURN ON POWER SUPPLY :

DESIGNATED DAY          : EVERY DAY
          DESIGNATED TIME INSTANT : 8:30

TURN OFF POWER SUPPLY :

DESIGNATED DAY          : EVERY DAY
          DESIGNATED TIME INSTANT : 19:30
          END PLAN                : WAIT FOR END OF JOB
                                    UNDER EXECUTION
```

FIG.7B

802 OPERATION DEFINITION INFORMATION

```
DEFINITION SUBJECT : COMPUTER A,B

JOB EXECUTION CONTROL :

JOB NET B : JOB B1 , { JOB B21, JOB B22 } , JOB B3

DESIGNATED DAY          : EVERYDAY
          DESIGNATED TIME INSTANT : 12:00
          JOB B21                 :

JOB SORT   : SUBMIT JOB
                    JUDGE END  : CONTINUOUSLY NORMAL
                    SET IN DETAIL : --------------------
                          ⋮
```

FIG.9A

| IMPORTANCE DEGREE (901) | DATE (902) | TIME INSTANT (903) | NOTIFICATION SOURCE (904) | MESSAGE (905) |
|---|---|---|---|---|
| Normal | 6/23 | 9:02 | COMPUTER A | POWER SUPPLY IS TURNED ON |
| Normal | 6/23 | 9:04 | COMPUTER A | JOB NET A IS STARTED |
| Normal | 6/23 | 9:10 | COMPUTER A | PRINTING OF PRINTER A IS STARTED |
| Error | 6/23 | 9:13 | COMPUTER A | FAILURE OCCURS DURING PRINTING OPERATION BY PRINTER A |

| IMPORTANCE DEGREE (901) | DATE (902) | TIME INSTANT (903) | NOTIFICATION SOURCE (904) | MESSAGE (905) |
|---|---|---|---|---|
| Error | 6/23 | 9:13 | COMPUTER A | FAILURE OCCURS DURING PRINTING OPERATION BY PRINTER A |
| Error | 6/23 | 9:40 | COMPUTER B | JOB NET B IS ENDED UNDER ABNORMAL STATE |

1001 EVENT/LOG TABLE

| 1010 EVENT/LOG IDENTIFIER | 1011 NAME OF COMPUTER | 1012 TIME INSTANT | 1013 EVENT/LOG SORT | 1014 OPERATION DEFINITION INFORMATION IDENTIFIER | 1015 DETAILED INFORMATION |
|---|---|---|---|---|---|
| #1001 | COMPUTER A | 6/16/9:02 | TURN ON POWER SUPPLY | #1101 | INITIATE UNDER NORMAL STATE |
| #2001 | COMPUTER A | 6/16/9:04 | START JOB NET A | #2101 | INITIATE UNDER NORMAL STATE |
| #3001 | COMPUTER A | 6/16/9:10 | START PRINTING | #3101 | PRINTER A |
| #3002 | COMPUTER A | 6/16/9:12 | END PRINTING | #3101 | PRINTER A UNDER NORMAL STATE |

FIG.10B

1003 COMMON TABLE
1002 OPERATION DEFINITION TABLE

| 1016 OPERATION DEFINITION INFORMATION IDENTIFIER | 1017 NAME OF COMPUTER | 1018 SORT OF OPERATION DEFINITION INFORMATION |
|---|---|---|
| #1101 | COMPUTER A | POWER SUPPLY CONTROL |
| #2101 | COMPUTER A | JOB NET |
| #3101 | COMPUTER A | PRINTING |

FIG.10C

1004 OPERATION DEFINITION DETAILED TABLE (POWER SUPPLY CONTROL)

| 1019 OPERATION DEFINITION INFORMATION IDENTIFIER | 1020 INITIATION DAY OF POWER SUPPLY | 1021 INITIATION TIME OF POWER SUPPLY | 1022 TURN OFF DAY OF POWER SUPPLY | 1023 TURN OFF TIME OF POWER SUPPLY |
|---|---|---|---|---|
| #1101 | MONDAY TO FRIDAY | 9:00 | MONDAY TO FRIDAY | 21:00 |

FIG.10D

1005 OPERATION DEFINITION DETAILED TABLE (JOB NET)

| 1024 OPERATION DEFINITION INFORMATION IDENTIFIER | 1025 JOB NET NAME | 1026 INITIATION DAY | 1027 INITIATION TIME INSTANT | 1028 STRUCTURAL JOB |
|---|---|---|---|---|
| #1101 | JOB NET A | MONDAY TO FRIDAY | 9:03 | JOB A1, {JOB A21, JOB A22}, JOB A3 |

METHOD FOR CONTROLLING MANAGING COMPUTER, MEDIUM FOR STORING CONTROL PROGRAM, AND MANAGING COMPUTER

This application is a continuation of U.S. application Ser. No. 09/179,091, filed Oct. 27, 1998 now U.S. Pat. No. 6,219,701.

BACKGROUND OF THE INVENTION

The present invention is related to a managing computer connected to a network to which a plurality of computers are connected, for managing these computers. More specifically, the present invention is directed to a technique capable of managing administrate operations executed in the respective computers in a batch mode by the managing computer.

Managing computers for managing administrate operations are described in U.S. Pat. No. 5,169,655 entitled to Weng et al., and U.S. Pat. No. 5,642,508 entitled to Miyazawa. The administrate operations involve a job execution process; and a process executed when a specific event occurs.

In a large-scaled computer system where a plurality of administrate operations may be combined with each other to be executed, since definitions as to the respective administrate operations must be separately performed and also execution results must be independently confirmed, the management for the total computer system can be hardly carried out.

More specifically, in a large-scaled computer system, there are certain possibilities that a plurality of administrate operations which are executed in combination with each other are executed over a plurality of computers. Under such a circumstance, in order to realize a total management as a computer system, processed contents as to all of administrate operations may be preferably defined and execution results thereof may be preferably confirmed by using a single computer, namely a single managing computer.

However, in the case that the definitions of the processed contents and the confirmations of the execution results as to all of the administrate operations may be performed by one managing computer, since the managing computer must be communicated with the respective computers, a specific care should be paid to the network traffics.

SUMMARY OF THE INVENTION

Therefore, an object of the present invention is to realize such a computer system to which a plurality of computers are connected. In this computer system, a managing computer for managing these computers can manage administrate operations executed in the respective computers are managed in a batch mode.

Furthermore, another object of the present invention is to avoid such that an extra load is given to a network connecting a managing computer group, which is caused by an operation managing computer.

To achieve the above-described object, there is provided a managing computer comprising:

an acquiring device for acquiring log information and event information from any of plural computers connected via a network to each other, said log information indicating as to whether or not an execution of an operation process is carried out under normal condition, and said event information indicating concisely as to whether or not an execution of an operation process is carried out under normal condition;

a data controller for storing into a database, operation definition information used to define a schedule of process operations executed in said plural computers in relation to said log information and said event information acquired by said acquiring device; and a display device for displaying said operation definition information in relation to event information related to a process operation defined by said operation definition information with reference to the information stored in said database. It is possible to provide a managing computer, according to a first aspect of the present invention, is featured by such a managing computer connected to a network to which a plurality of computers are connected, for managing these computers, comprising:

acquisition means for acquiring log information indicative of an execution result of an administrate operation executed in each of the computers and also event information indicative of an event occurred in an execution stage of the administrate operation from each of said computers;

storage means for into a database, operation definition information in which a schedule of the administrate operations executed in the respective computers, and also the log information and the event information acquired by said acquisition means; and display means for displaying the operation definition information related to the respective computers in relation to log information and event information of an administrate operation defined by the operation definition information with reference to the information stored into the database by the storage means.

Also, a managing computer, according to a second aspect of the present invention, is featured by such a managing computer connected to a network to which a plurality of computers are connected, for managing these computers, comprising:

acquisition means for acquiring log information indicative of an execution result of an administrate operation executed in each of the computers and also event information indicative of an event occurred in an execution stage of the administrate operation from each of said computers;

storage means for into a database, operation definition information in which a schedule of the administrate operations executed in the respective computers, and also the log information and the event information acquired by said acquisition means; and display means for displaying both a region for describing a list of administrate operations defined by the operation definition information related to each of the computers and also another region for describing log information of said computer on the same screen with reference to the information stored into the database by the storage means. It is possible to display relative information between an event and event definition information together with either of them.

Also, a managing computer, according to a third aspect of the present invention, is featured by such a managing computer connected to a network to which a plurality of computers are connected, for managing these computers, comprising:

definition means for forming in a batch mode both a schedule of each of administrate operations and operation definition information in which a computer which should execute each of the administrate operations is defined;

distribution means for distributing the operations definition information;

acquisition means for acquiring the operation definition information individually formed by the computers from the respective computers and operation definition information in which a portion of the operation definition information distributed by the distribution means and related to the own computer is expanded by the computer from the distributed operation definition information, and also for acquiring log information indicative of an execution result of an administrate operation executed in each of the computers and also event information indicative of an event occurred in an execution stage of the administrate operation from each of said computers;

storage means for into a database, the operation definition information acquired by the acquisition means, and also the log information and the event information acquired by the acquisition means; and display means for displaying the operation definition information related to the respective computers in relation to log information and event information of an administrate operation defined by the operation definition information with reference to the information stored into the database by the storage means.

It should be understood that each of the computers managed by the managing computer according to the third aspect many expand the operation definition information of a portion related to the own computer from the operation definition information distributed from the managing computer, and also many convert both the log information and the event information of the administrate operation executed by the own computer into a predetermined common format.

Also, in the third aspect, the above-explained definition means may define such a computer which should execute the administrate operation by employing predetermined information for indicating all of the computers as to the administrate operations to be executed by all of the computers.

Also, in any of the first aspect to the third aspect, the above-described acquisition means may acquire at regular timing, or preselected timing a predetermined sort of log information among the log information of the respective computers, and further may acquire other sorts of log information when these sorts of log information is required to be displayed by the display means.

Also, in any of the first aspect to the third aspect, the display means may immediately display either all or a portion of the event information acquired by the acquisition means after being acquired.

It should also be understood in this specification that a "computer" implies not only an apparatus for merely performing a calculation, but also an apparatus for executing a communication process and further various sorts of information process.

BRIEF DESCRIPTION OF THE DRAWINGS

For a more better understanding of the present invention, reference is made of a detailed description to be read in conjunction with the accompanying drawings; in which:

FIG. 6 is an explanatory diagram for showing an example of the operation definition information defined in a batch mode by the managing computer;

FIG. 7A and FIG. 7B are explanatory diagrams for indicating an example of the operation definition information of FIG. 6, which has been expanded;

FIGS. 9A and 9B are explanatory diagrams for showing examples of the event information displayed in the managing computer;

FIGS. 10A to 10D are explanatory diagrams for representing examples of structures of various sorts of tables on a database;

DESCRIPTION OF THE PREFERRED EMBODIMENTS

Referring now to drawings, embodiment modes of the present invention will be described.

Figure 1:
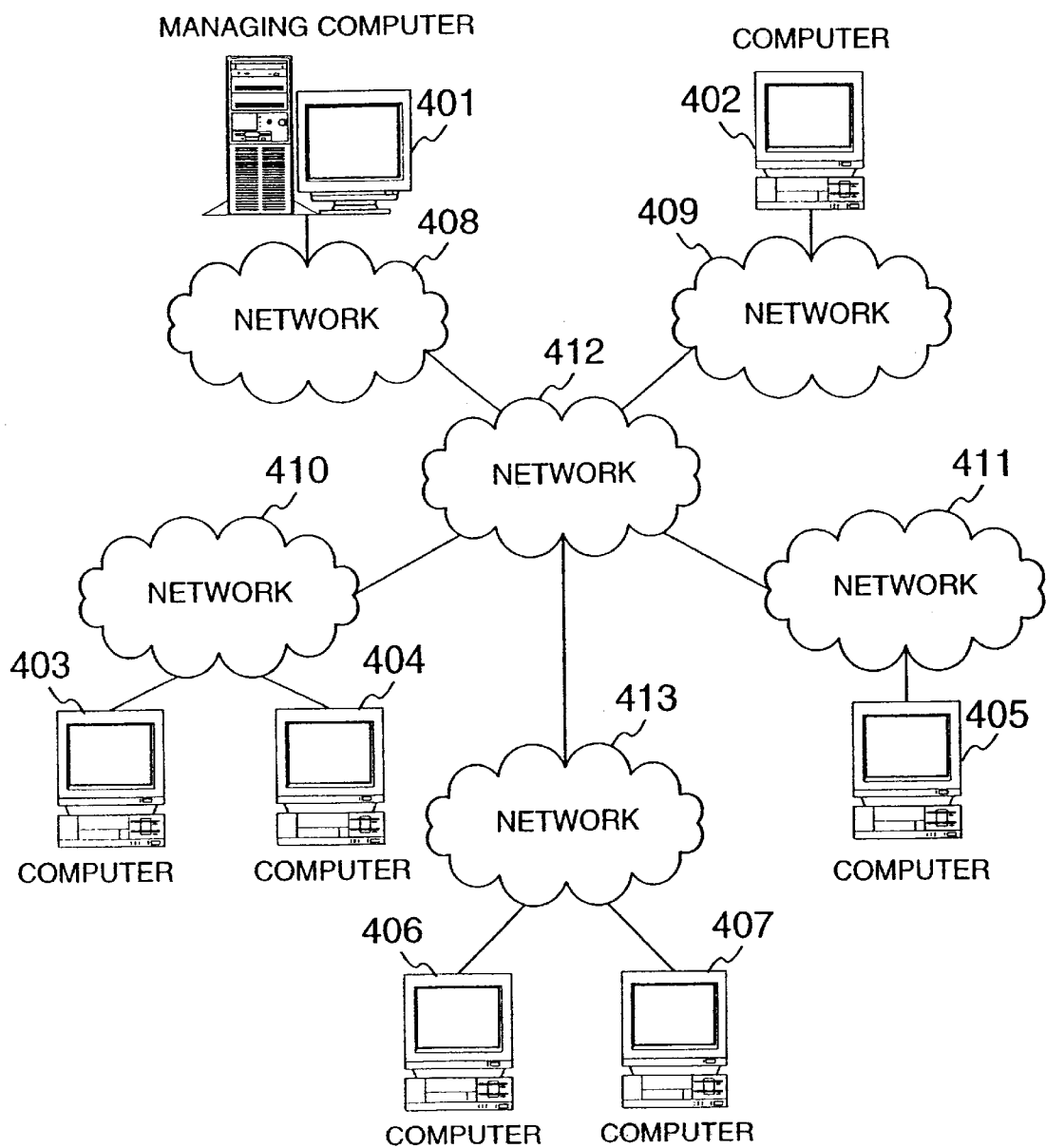
FIG. 1 schematically shows an overall structural diagram of a computer system according to an embodiment of the present invention.

FIG. 1 schematically indicates an entire arrangement of a computer system according to an embodiment of the present invention. In this drawing, reference numeral 401 indicates a managing computer; reference numerals 402 to 407 represent computers which constitute subjects managed by the managing computer; and reference numerals 408 to 413 show networks.

In the computer system according to this embodiment, the managing computer 401 can form in a batch mode operation definition information used to define schedules of administrate operations executed in the computers 402 to 407, and furthermore the managing computer 401 can manage in a batch mode both log information indicative of execution results obtained from the computers 402 to 407, and event information indicative of events occurred during execution stage.

As a result, since the managing computer 401 can save the operation definition information, the log information, and the event information in a database form, this managing computer 401 may refer to the above-described information, if necessary, and also may display various items related to the above-explained information.

Figure 2:
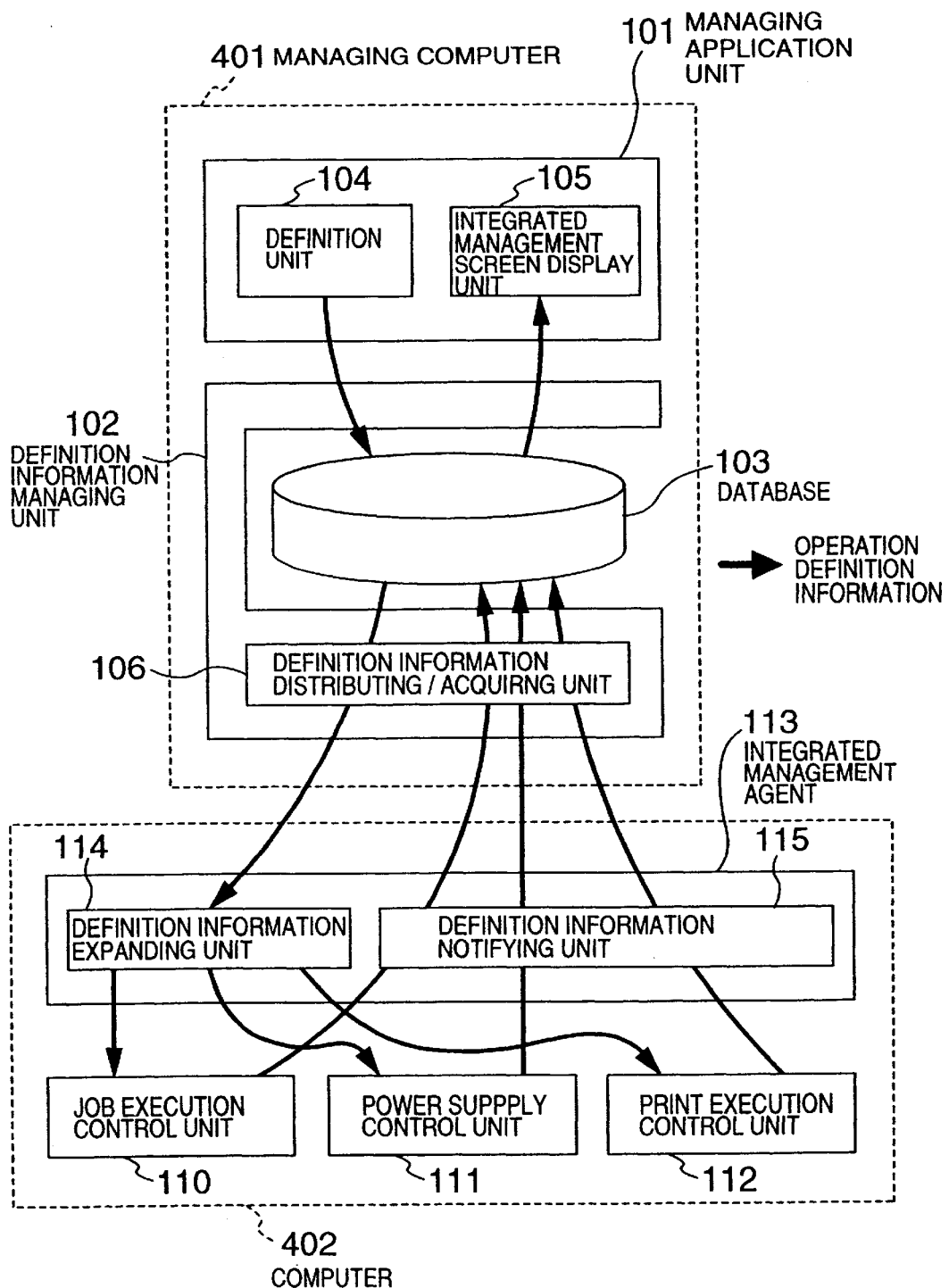
FIG. 2 is an explanatory diagram for explaining a system arrangement used to form by a managing computer in operation definition information for defining schedules of administrate operations executed by computers.

FIG. 2 schematically represents a system arrangement used to form by the managing computer 401, the operation definition information which defines the schedules of the administrate operations executed by the computers 402 to 407. It should be understood that although FIG. 2 represents only one computer 402 and the managing computer 401 of FIG. 1, other computers 403 to 407 may be similarly displayed.

As indicated in FIG. 2, the managing computer 401 is arranged by a managing application unit 101, a definition information managing unit 102, and a database 103.

The managing application unit 101 contains a definition unit 104 and an integrated management screen display unit 105. The batched definition unit 104 forms operation definition information used to define a schedule of administrate operations executed by the computers 402 to 407. The integrated management screen display unit 105 displays an integrated management screen (will be discussed later) and so on. The definition information managing unit 102 contains a definition information distributing/acquiring unit 106 for distributing the operation definition information to the computers 402 to 407, and for acquiring the operation definition information from the computers 402 to 407. This definition information managing unit 102 stores the operation definition information into the database 103, and retrieves/referring to the operation definition information stored in the database 103.

As indicated in FIG. 2, each of the computers 402 to 407 is arranged by employing an operation execution unit and an integrated management agent 113. This operation execution unit contains a job execution control unit 110, a power supply control unit 111, a print execution control unit 112 and the like, which execute the administrate operation defined by the operation definition information.

The integrated management agent 113 contains a definition information expanding unit 114 and a definition information notifying unit 115. The definition information expanding unit 114 expands operation definition information of a portion related to the own computer from the operation definition information distributed from the managing computer 401. The definition information notifying unit 115 notifies to the managing computer 401, the operation definition information related to the own computer and involving also the operation definition information individually formed by the own computer.

Figure 3:
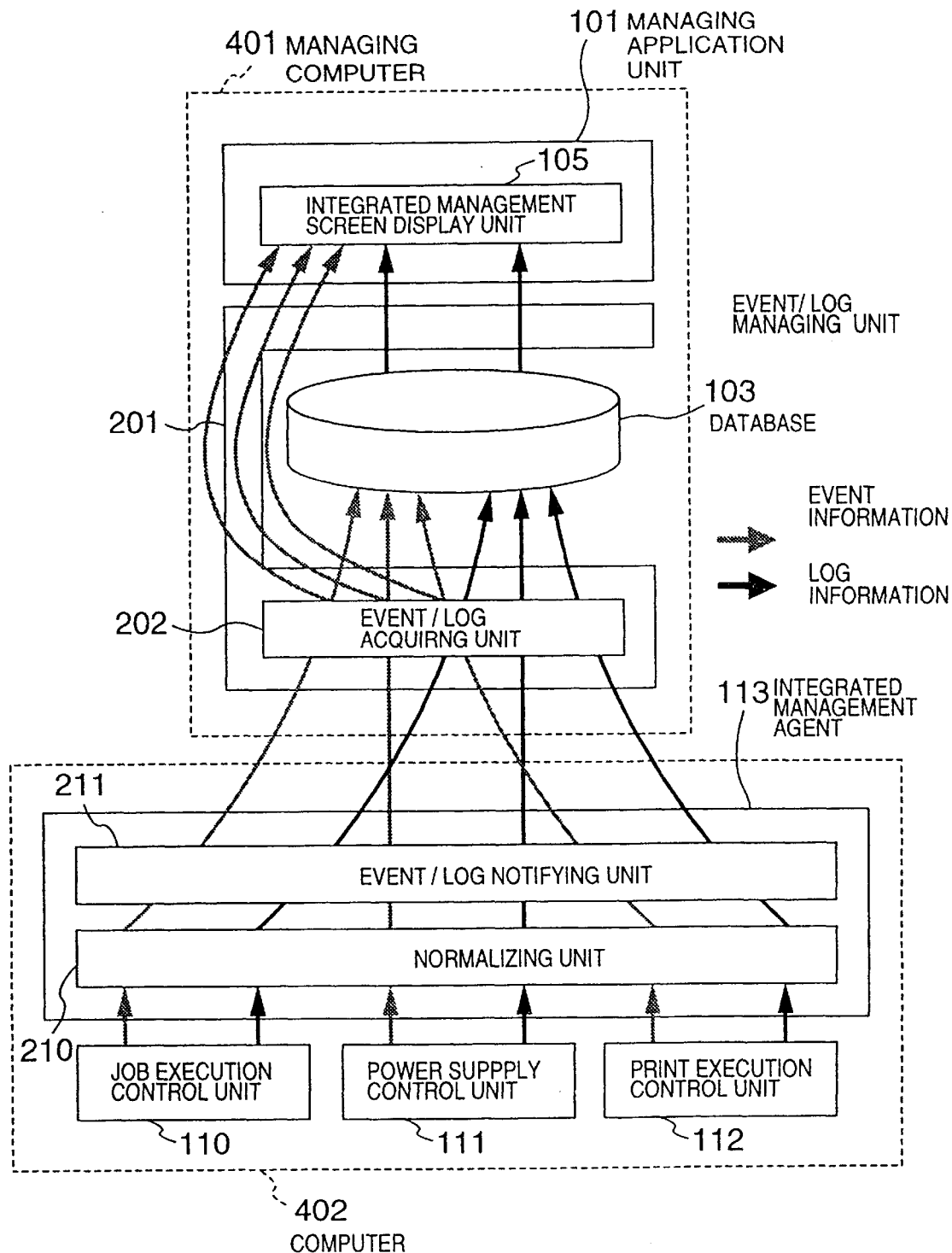
FIG. 3 is an explanatory diagram for explaining a system arrangement used to manage by the managing computer in both log information of administrate operations and event information, executed by the computers.

FIG. 3 represents a system arrangement in which both log information and event information of administrate operations executed by the computers 402 to 407 are managed in a batch mode by the managing computer 401. Although FIG. 3 shows only the managing computer 401 and one computer 402 of FIG. 1, other computers 403 to 407 are similarly applied to this computer 402.

As indicated in FIG. 3, the managing computer 401 is arranged by employing a managing application unit 101, an event/log managing unit 201, and a database 103.

The managing application unit 101 contains the integrated management screen display unit 105 for displaying the integrated management screen (will be explained later) and so on. The event/log managing unit 201 contains the event/log acquiring unit 202 for acquiring the event information and the log information from the computers 402 to 407, and retrieves/refers to the event information and the log information, which are stored in the database 103. Also, the event/log managing unit 201 stores into the database 103 and outputs to the integrated management screen display unit 105 as to event information which should be notified in real time to an operation manager and so on.

As indicated in FIG. 3, each of the computers 402 to 407 is arranged by employing an operation execution unit and an integrated management agent 113. This operation execution unit contains a job execution control unit 110, a power supply control unit 111, a print execution control unit 112 and the like, which execute the administrate operation defined by the operation definition information.

The integrated management agent 113 contains a normalizing unit 210 and an event/log notifying unit 211. The normalizing unit 210 converts both log information and event information of administrate operation executed by the own computer into a predetermined common format. The event/log notifying unit 211 notifies the normalized log information and the normalized event information to the managing computer 401.

Figure 4:
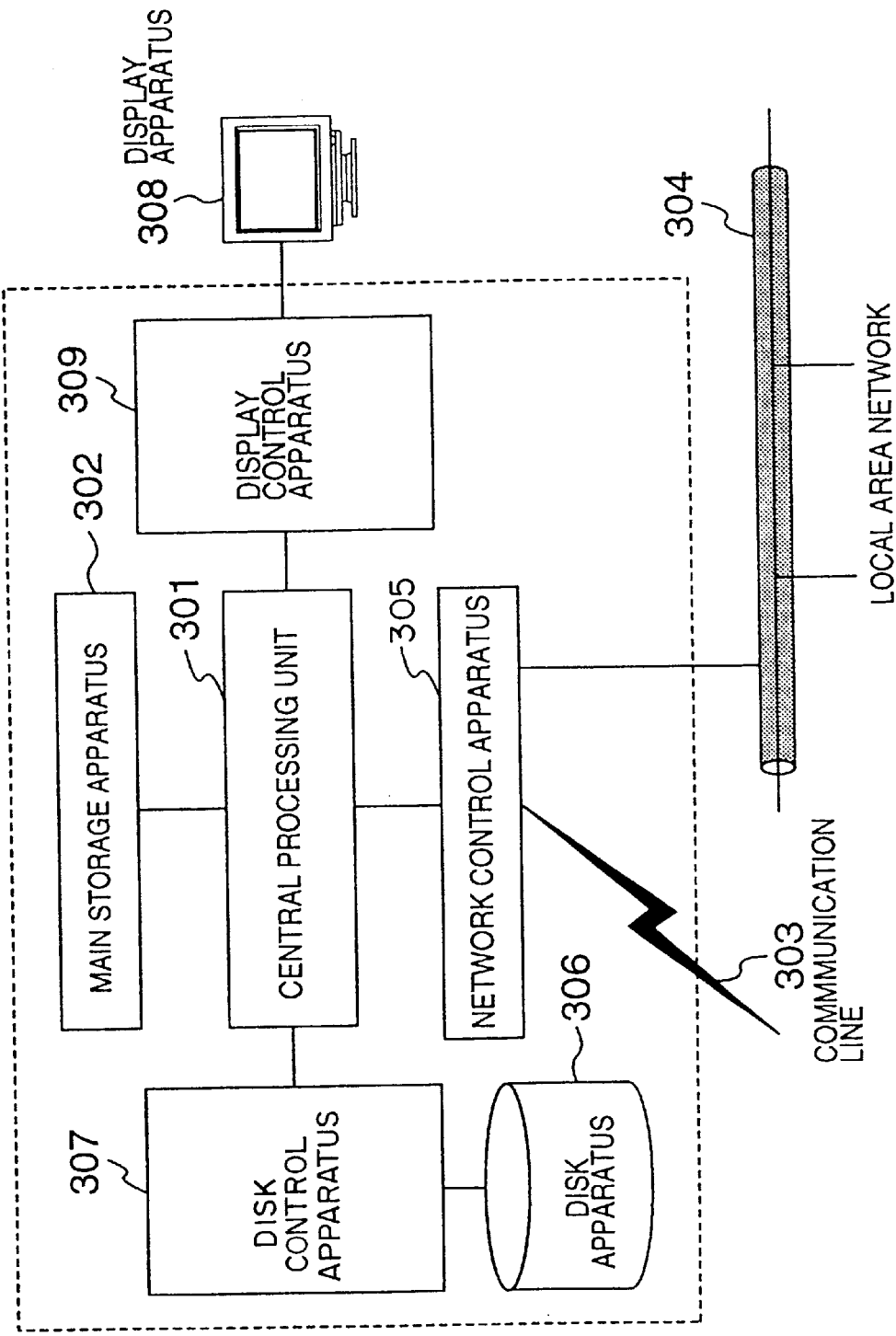
FIG. 4 schematically represents a hardware structural diagram of the managing computer and the computers.

FIG. 4 schematically indicates a hardware structure of the managing computer 401 and the computers 402 to 407.

As indicated in FIG. 4, each of the computers is arranged by employing a central processing unit 301, a main storage apparatus 302, a network control apparatus 305, a disk control apparatus 307, and a display control apparatus 309. The network control apparatus 305 controls input/output of data between this network control apparatus 305 and a network such as a communication line 303 and a local area network 304. The disk control apparatus 307 controls a disk apparatus 306 and also input/output thereof. The display control apparatus 309 controls a display apparatus 308 and also input/output thereof.

Among the structural blocks of FIG. 2 and FIG. 3, the database 103 is realized on the disk apparatus 306. Other structural blocks are realized in such a way that a program stored in the disk apparatus 306 is loaded by the central processing unit 301 on the main storage apparatus 302. It should be noted that this program may be recorded on, for instance, a recording medium such as a CD-ROM, and then may be read into a driver (not shown) to be stored into the disk apparatus 306.

Figure 5:
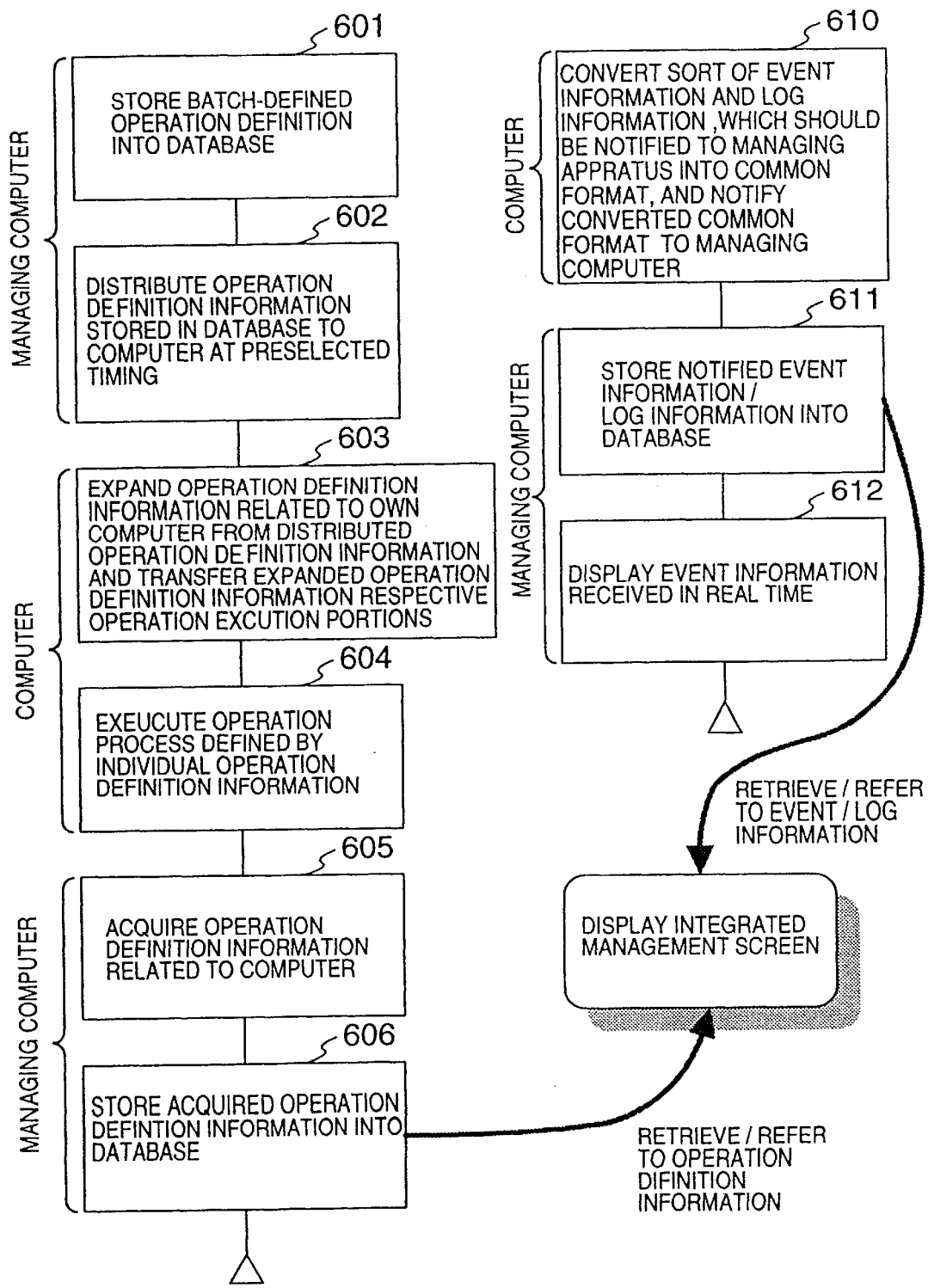
FIG. 5 explanatorily indicates a sequential operation for defining/distributing in a batch mode the operation definition information in the system arrangement of FIG. 1, and another sequential operation for acquiring/managing in a batch mode the event information and the log information in the system arrangements of FIG. 3.

Referring now to FIG. 5, a description will be made of a sequential operation for defining and distributing the operation definition information in the system arrangement of FIG. 2.

As indicated in FIG. 5, in the managing computer 401, the definition information managing unit 102 stores into the database 103, the operation definition information defined by the batched definition unit 104 contained in the managing application unit 101 (step 601). The operation definition information stored in the database 103 is distributed to the computers 402 to 407 at preselected timing by the definition information distributing/acquiring unit 106 contained in the definition information managing unit 102 (step 602).

In the computers 402 to 407 to which the operation definition information is distributed, the definition information expanding unit 114 owned by the integrated management agent 113 expands operation definition information of a portion related to the own computer from the distributed operation definition information. The definition information expanding unit 114 transfers the expanded operation information to the operation execution unit such as the job execution control unit 110, the power supply control unit 111, and the print execution control unit 112 (step 603). The operation execution unit executes the administrate operation defined by the respective transferred operation definition information (step 604).

On the other hand, in the managing computer 401, the definition information distributing/acquiring unit 106 of the definition information managing unit 102 acquires from the computers 402 to 407, the operation definition information related to the computers 402 to 407 and also containing the operation definition information individually formed in the computers 402 to 407 (step 605). Subsequently, the definition information managing unit 102 stores the acquired operation definition information into the database 103 (step 606).

In the case that the integrated screen display unit 105 owned by the managing application unit 101 displays an integrated management screen (will be explained later) in response to a reference request issued from an operation manager and the like, the operation definition information stored into the database 103 in this manner will be retrieved/referred by the definition information managing unit 102.

It should be understood that the operation definition information may be acquired in such a way that the definition information distributing/acquiring unit 106 contained in the definition information managing unit 102 in the managing computer 401 periodically issues a command to the computers 402 to 407. Alternatively, the acquisition of the operation definition information may be realized by such that the definition information notifying unit 115 owned by the integrated management agent 113 in the computers 402 to 407 initiatively notifies the operation definition information to the managing computer 401 at preselected timing.

FIG. 6 shows an example of operation definition information which is defined by the managing computer 401. In this drawing, reference numeral 701 shows operation definition information.

In a definition of the operation definition information 701, a "definition subject 710" corresponds to a portion for defining a computer to be defined. The definition subject 710 may designate a group constituted by a plurality of computers, and a single computer. As represented in FIG. 6, it should be understood that when predetermined information (in this case, "default") is designated in "definition subject 710", this information implies that all of the computers are the definition subjects.

A "power supply control (711)" corresponds to a portion used to define an execution schedule of a power supply turning ON/OFF process of a computer to be defined, and a turning OFF method. A "job execution control (712)" corresponds to a portion used to define a job net on a computer to be defined, and a job on the job net. In the example of FIG. 6, a "job net A" defines that after an execution of a "job A1" has been completed, a "job A21" and a "job A22" are executed in a parallel manner, and then when the executions of both these jobs A21 and A22 are completed, a "job A3" is executed.

As previously explained, since the operation manager and the like designate such a computer for executing the schedule of the respective administrate operations and also the respective administrate operations in the managing computer 401, the operation definition information can be formed in a batch manner, on which the schedule of the administrate operation to be executed by the computer is defined.

FIG. 7A and FIG. 7B show an example of the operation definition information 701 of FIG. 6 which is expanded by the computer. In FIG. 7A and FIG. 7B, there are shown operation definition information 801 to 802 which have been expanded in the computers 402 to 407 of FIG. 2. Each of the above-described operation definition information 801 and 802 is transferred to the power supply control unit 111 and the job execution control unit 110.

Next, a sequential operation for acquiring and for managing in a batch mode the event information and the log information in the system arrangement of FIG. 3 will now be described with reference to FIG. 5.

As indicated in FIG. 5, in such a case that either the event information or the log information notified from the administrate operation unit is equal to a preselected sort of information which should be notified to the managing computer 401, the normalizing unit 210 owned by the integrated management agent 113 in each of the computers 402 to 407 converts this event, or log information into a common format to which a discrimination of event/log information is added. Then, the converted common format is notified by the event/log notifying unit 211 to the managing computer 401 (step 610).

In the managing computer 401 to which either the event information or the log information is notified, the event/log acquiring unit 202 owned by the event/log managing unit 201 stores the notified event information, or the notified log information into the database 103 (step 611). The log information is related to an abnormal state occurred during processing operation and includes information related to an abnormal state occurred during processing operation, whereas the event information is such information which is more important and concise than the former and necessary to inform to the manager computer in real time as to an urgent abnormal event occurred in the operation stage to be cared for by an operator. As a result, in the case that the event information is notified, it is preferable to immediately display this event information on the display apparatus 308 by the integrated management screen display unit 105 owned by the managing application unit 101 (step 612). It should also be noted that information may be discriminated as either log information or event information based upon discrimination contained in this information. As another embodiment, this information may be discriminated as either log information or even information based upon the path through which this information is transferred.

As explained above, in the case that the integrated management screen display unit 105 owned by the managing application unit 101 displays an integrated management screen (will be explained later) in response to a reference request sent from the operation manager, both the event information and the log information stored in the database 103 are retrieved/referred by the definition information managing unit 102.

The notifications of the event information and the log information may be preferably realized as to such event information with a high real time characteristic (in particular, event information indicative of failure) as follows. In the computers 402 to 407, the event/log notifying unit 211 owned by the integrated management agent 113 initiatively notifies the event information to the managing computer 401. As to the notification of the log information, in the managing computer 401, the event/log acquiring unit 202 owned by the event/log managing unit 201 may be realized by regularly issuing a command to the computers 402 to 407. Alternatively, the notification of the log information may be realized by that in the computers 402 to 407, the event/log notifying unit 211 owned by the integrated management agent 113 initiatively notifies the log information to the managing computer 401 at preselected timing.

Subsequently, referring now to FIG. 8, a description will be made of one example of an integrated management screen which is displayed by the integrated management screen display unit 103 owned by the managing application unit 101 in the managing computer 401.

As previously explained, since the operation definition information, the event information, and the log information are stored in the database 103 in the managing computer

401, the operation manager and the like may grasp the operations conditions of the computer system by utilizing the above-explained information. In other words, within the managing computer 401, the integrated management screen display unit 105 owned by the managing application unit 101 causes the definition information managing unit 102 to retrieve/refer to such information which is required by the operation manager to refer to. Then, this integrated management screen display unit 105 forms as integrated management screen by using the retrieved/referred information, and displays the formed integrated management screen on the display apparatus 308. As a result, the operation manager can grasp the operation condition of the computer system by observing the integrated management screen displayed on the display apparatus 308.

Figure 8:
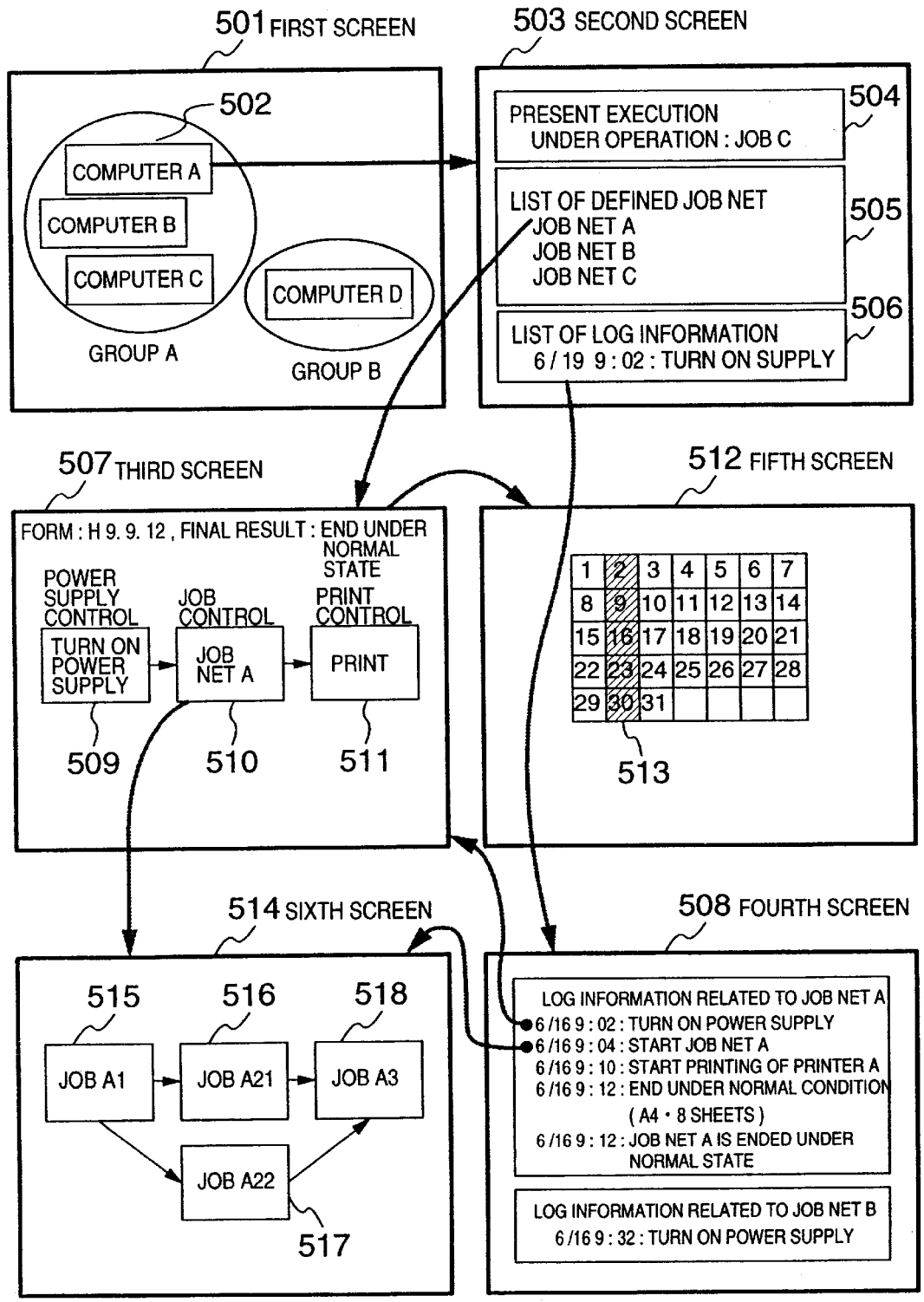
FIG. 8 is an explanatory diagram for representing an example of an integrated management screen displayed in the managing computer.

In FIG. 8, a first screen 501 is an integrated management screen used to confirm computers managed by the managing computer 401 and also to confirm a group of these computers. In this example, four sets of computers A to D are indicated. The respective computers A to D are displayed as icons. For example, in the first screen 501, the operation manager double-clicks "computer A (502)" by using a mouse, so that the first screen 501 can be transferred to a second screen 503.

Also, in FIG. 8, the second screen 503 is an integrated management screen used to confirm an operation condition of "computer A (502)". With respect to the "computer A (502)", a present job execution condition (504), a list (505) of a job net whose execution is defined on the "computer A", and a list (506) of log information corresponding to a past operation history are displayed in a message form on this second screen 503. For example, when the operation manager wants to confirm an operation condition related to "job net A" on the second screen 503, the operation manager double-clicks a column related to "job net A" listed in the job net list 505 by using the mouse, so that the second screen 503 can be transferred to a third screen 507.

Also, in FIG. 8, the third screen 507 is an integrated management screen related to "job net A" on "computer A". This integrated management screen indicates such operation definition information on which a series of administrate operations are defined as to "computer A", i.e., "turning ON of power supply (509)", "execution of job net A (510)", and "printing of execution result (511)".

It should be noted that these administrate operations 509 to 511 are displayed as icons. Since a display mode of each of these icons is changed (for instance, color and shape are changed), various sorts of conditions may be displayed such as "not yet executed", "under execution", "execution is ended under normal state", and "execution is ended under abnormal state". In this case, when the display modes of the respective icons are changed by the integrated management screen display unit 105, the latest event information of the corresponding administrate operations (509 to 511) is preferably acquired by the event/log acquiring unit 202 owned by the event/log managing unit 201.

For example, when "job net A (501)" is double-clicked by using the mouse by the operation manager, the third screen 507 can be transferred to a sixth screen 514.

Also, in FIG. 8, a fifth screen 512 corresponds to an integrated management screen used to confirm the operation definition information displayed on the third screen (507) in a calendar format. For example, since the operation manager selects menu of "calendar display" (not shown) on the third screen 507, the third screen 507 can be transferred to the fifth screen 512. In this example, this fifth screen 512 displays that the job seen on the third screen is executed on a date 513 of a hatched portion.

Also, in FIG. 8, a sixth screen 514 is a detailed integrated management screen related to "job net A" on "computer A". This sixth screen 514 defines such that as to "job net A", after an execution of "job A1 (515)" is completed, both "job A21 (516)" and "job A22 (517)" are executed in a parallel manner, and when the executions of both "job A21 (516)" and "job A22 (517)" are completed, "job A3 (518)" is executed.

It should also be noted that these jobs are displayed as icons. Since a display mode of each of these icons is changed (for instance, color is changed), various sorts of conditions may be displayed such as "not yet executed", "under execution", "execution is ended under normal state", and "execution is ended under abnormal state". In this case, when the display modes of the respective icons are changed by the integrated management screen display unit 105, the latest event information of the corresponding administrate operations (509 to 511) is preferably acquired by the event/log acquiring unit 202 owned by the event/log managing unit 201.

Also, in FIG. 8, a fourth screen 508 corresponds to an integrated management screen used to confirm a log with respect to each of job nets. For instance, since the operation manager double-clicks a list (506) of the log information on the second screen 503, the second screen 503 can be transferred to the fourth screen 508. Alternatively, for example, while the operation manager designates a column related to "job net A" within the job list 505 by clicking this column by using the mouse, this operation manager selects menu of "log display" (not shown). As a result, the second screen 503 may be transferred to another screen (not shown) on which only log information of "job net A" is displayed.

It should be understood that when the operation manager selects, for example, the corresponding menu within any of the second screen 504 to the sixth screen 514, the present screen may be transferred to other screens involving such not-shown screens (event information display screen, statistical display screen, operation definition information updating screen etc.). It will be possible to click a certain message shown in screen 508 to additionally display the window 514 or 507 as indicated with arrows.

As previously explained, in accordance with this embodiment, in the managing computer 401, the operation definition information related to the respective computers is displayed in connection with both the log information and the event information of the administrate operations defined by this operation definition information. As a consequence the operation manager can grasp the operation conditions of the computer system, and furthermore can readily reflect the grasped operation conditions onto a further plan of the operation schedule.

As previously described, after the event information is notified, the managing computer 401 preferably and immediately displays this notified event information on the display apparatus 308. At this time, a screen displayed in the managing computer 401 is represented in, for instance, FIG. 9A.

FIG. 9A represents an example of a screen on which event information of a computer A is displayed as a message among the notified event information. In this drawing, the message is constructed of an importance degree 901 of the event information, day/time 902 to 903 when the event is notified, a computer 904 of a notification source, and a message main body 905.

The managing computer 401 may display all of the notified event information as a message. Alternatively, as indicated in FIG. 9B, the managing computer 401 may display only pre-designated sorts of event information. As a pre-designated basis, the following items may be conceived, e.g., an importance degree; a range for a date and a time instant; a computer of a notification source; a sort of administrate operation; and a pattern of a character string contained in event information. The operation manager may designate a sort of event information displayed as a message by either the managing computer 401 or the respective computers 402 to 407.

Then, in the managing computer 401, the event/log managing unit 201 judges as to whether or not the notified event information is displayed as the message. The event/log managing unit 201 immediately notifies to the integrated management screen display unit 105 owned by the managing application unit 101, such event information which is judged to be displayed as a message. Then, the integrated management screen display unit 105 displays this judged event information. Therefore, for instance, as represented in FIG. 9, only such event information indicative of a failure may be displayed as a message. It should be understood that event/log managing unit 201 stores the notified event information into the database 103 irrespective of such a judgment result as to whether or not the notified event information is displayed as the message.

FIG. 10A and FIG. 10B represent one example of structures of various sorts of tables on the database 103. In the drawings, reference numeral 1001 shows an event/log table, and reference numeral 1002 indicates an operation definition table.

The event/log table 1001 is such a table used to store thereinto the events and the log information acquired from the computer by the managing computer 401 in a time sequence. A single record is arranged by "identifier (1010)" "computer name (1011)", "time (1012)", "event/log sort (1013)", "identifier (1014)", and "detailed information (1015)". The identifier 1010 is for the event information and the log information. The computer name 1011 is a name of a computer for notifying this information. The time 1012 is time when this information is notified. The sort 1013 is the sort of this information. The identifier 1014 is an identifier of operation definition information on which administrate operation where this information is produced is defined. In the computer, the information 1010 to 1014 other than the detailed information 1015 is normalized as the common format commonly used to all of the event information and the log information by the normalizing unit 210 owned by the integrated management agent 113.

As indicated in FIG. 10B to FIG. 10D, an operation definition table 1002 is constituted by a common table 1003 arranged by an identifier 1016 of operation definition information, a name (1017) of a computer to be defined, and a sort (1018) of operation definition information; and also operation definition detailed tables 1004 to 1005 corresponding to the respective sorts (1018) of the operation definition information.

The operation definition detailed table 1004 related to the power supply control is arranged by, for example, an identifier (1019) of operation definition information; a power supply initiation date (1020); a power supply initiation time (1021); and a power supply turn-OFF date (1022), and also a power supply turn-OFF time (1023). The operation definition detailed table 1005 related to the job net is arranged by, for instance, an identifier (1024) of operation definition information; a name (1025) of a job net; a job net initiation date (1026); a job net initiation time (1027); and a structural job (1028).

In the managing computer 401, both the definition information managing unit 102 and the event/log managing unit 201 retrieve the tables 1001 to 1004 shown in FIG. 10A to FIG. 10D based on a language of, for instance, SQL. As a result, the integrated management screen display unit 105 owned by the managing application unit 101 can display such a screen as indicated in FIG. 8. In particular, the relationship among the event information, the log information, and the operation definition information may be established by employing the identifier (1014) of the operation definition information contained in the event/log table 1001 and the identifiers 1016, 1019, 1024 of the operation definition information contained in the operation definition table 1002.

It should be noted that when the screen is displayed, in such a case that information required to be displayed is not present in the tables 1001 to 1004 of FIG. 10, the managing computer 401 is operated in a similar manner to that shown in FIG. 5 so as to acquire this information required to be displayed.

Figure 11:
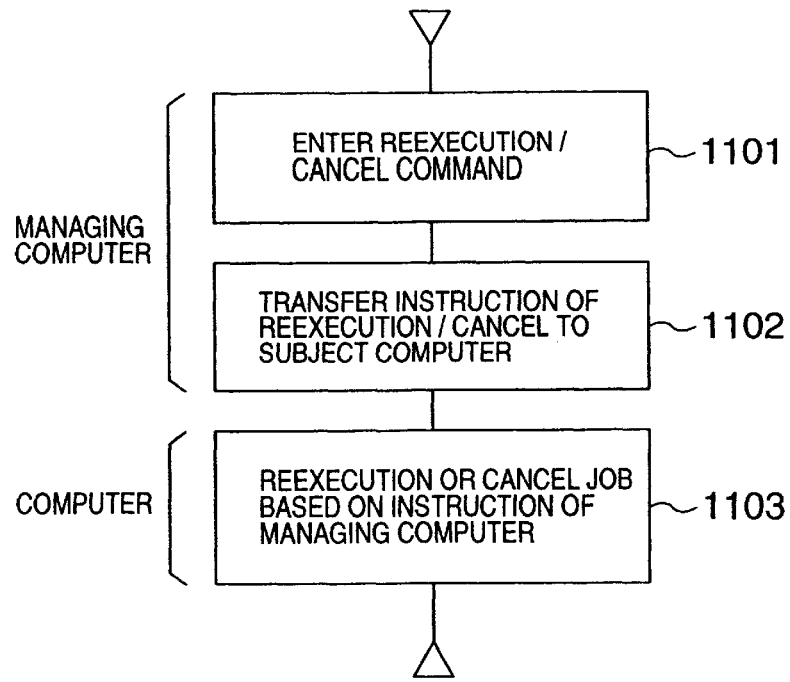
FIG. 11 is a flow chart for describing a process operation after a job is ended under abnormal state.
Figure 12:
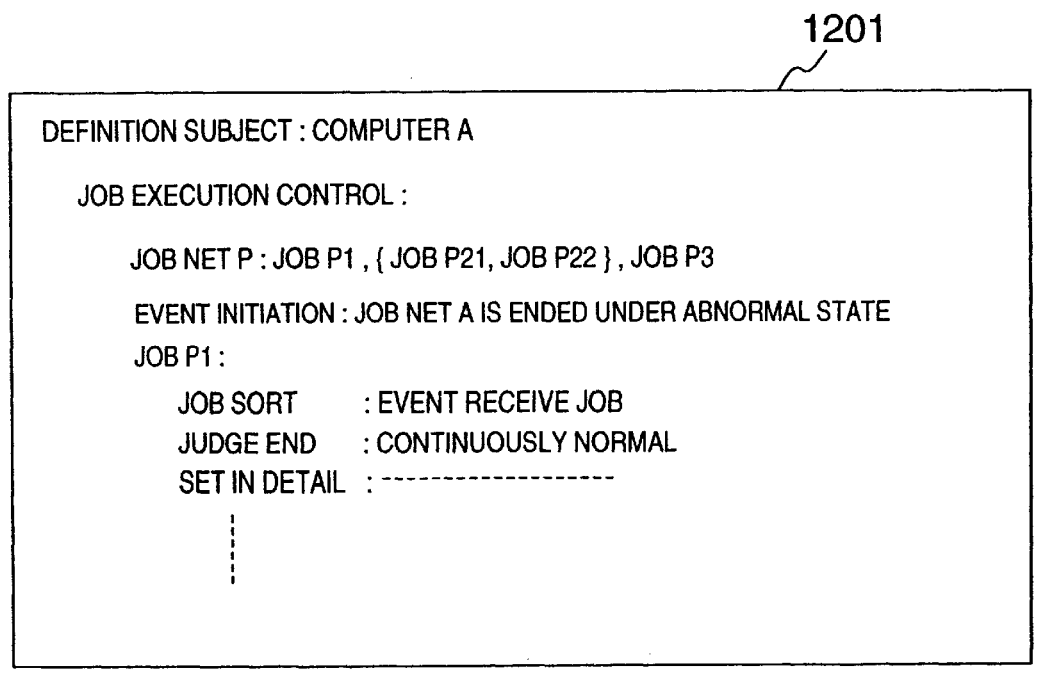
FIG. 12 is a diagram for indicating a definition of a process operation after the job is ended under abnormal state.
Figure 13:
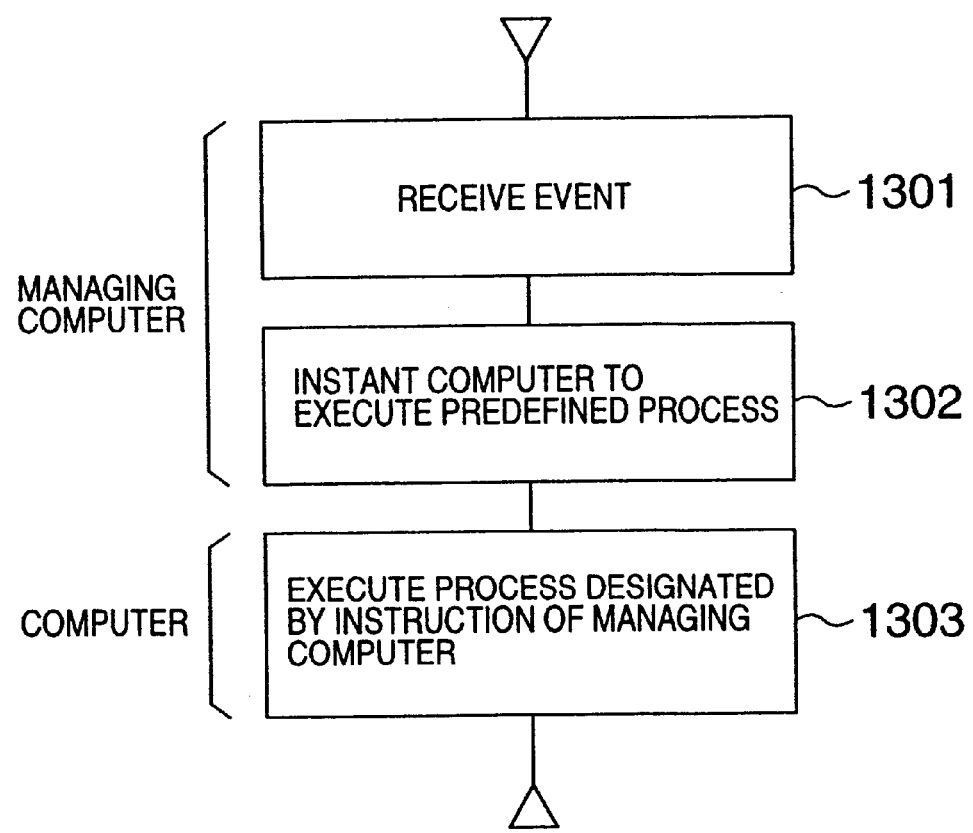
FIG. 13 is a flow chart for explaining a process operation by the managing computer which receives a specific event.

In the case that such information indicative of a failure occurred in operation conditions of the computer system is notified as an event, this computer system may be operated as follows. First, for example, when a specific job is accomplished under abnormal state while a job net is being executed, after removing a factor for causing this abnormally ended job (e.g., a specific file required to execute a job is not present), the computer system may instruct that this interrupted job is restarted. This instruction may be realized as follows. That is, as indicated in FIG. 11, in the managing computer, "reexecution command" for designating "subject computer", "job net name", "job name to be reexecuted" is entered (1101); this command is transferred to the above-explained subject computer (1102) so as to be executed (1103). Secondly, the computer system may instruct this job net not to be canceled. This second idea may be realized as follows. That is, as shown in FIG. 11, in the managing computer, "cancel command" for designating "subject computer " and "job net name" is entered (1101); this command is transferred to the above-described subject computer (1102) so as to be executed (1103). Furthermore, thirdly, when a specific job is ended under abnormal state while a job net is being executed, a specific job and also a specific job net, by which an abnormal end event is previously defined as a trigger, may be executed. This alternative method may be realized as follows. That is, as represented in FIG. 12, while the managing computer defines such a process operation which should be executed when a specific event is received (1201), when the managing computer receives this specific event as shown in FIG. 13 (1301), this managing computer instructs a subject computer to execute the designated process operation (1302). Then, the subject computer may execute this instruction (1303). At this time, the definition of either the job or the job net which should be executed by the subject computer may be transferred to be registered when the instruction is issued. Otherwise, this definition may be previously transferred to be registered.

Subsequently, a description will now be made of effects achieved in such a case that the operation definition information, the event information, and the log information are processed in the database form by the managing computer 401 to be stored.

As a first effect, a network traffic can be reduced. In accordance with the present invention, since the operation definition information, the event information, and the log information are stored in the database form by the managing computer 401, the managing computer 401 need not acquire the necessary information from the computer every time the operation manager and the like refer to these information.

For instance, in the network structure of FIG. 1, when log information of 1 K bytes is acquired from each of the six computers 402 to 407 by the managing computer at a frequency of 1,000 messages/day, a network traffic of 6 M bytes/day is produced. In the case that the log information is referred by the operation manager at a frequency of 10 times/day, a network traffic of 60 M bytes/day in total is produced.

Furthermore, as to such log information with a low demand of a real-time characteristic, if such log information is collected within such a time range where the normal network traffic is low, for example, in a night time range, the network traffic reduction effect can be apparently achieved.

As a second effect, since the operation definition information, the event information, and the log information are stored in the database form by the managing computer 401, as represented in the integrated management screen of FIG. 8, there is another effect that the above-explained information can be readily displayed in various relationship aspects.

In the computer system according to this embodiment, the computers 402 to 407 are set to be defined in a batch mode by the managing computer 401. However, it is conceivable that other computers which do not constitute a definition subject are connected to the networks 408 to 413. In this case, as a method for recognizing a subject computer to be managed by the managing computer 401, for example, there is a method for automatically detecting the integrated management agent 113 assembled into the computer by using, for example, a broadcasting method. As another method, a subject computer to be defined may be previously defined on the managing computer 401.

Also, in accordance with the computer system according to this embodiment, the operation definition information in which the schedule of the administrate operations executed by the computers 402 to 407 is defined can be formed in a batch mode by the managing computer 401, and furthermore both the log information and the event information of the administrate operations executed by the computers 402 to 407 can be managed by the managing computer 401, resulting in better results. Alternatively, if at least both the log information and the event information can be managed, then the operation manager may grasp the operation condition of the computer system.

What is claimed is:

1. A computer system comprising:
   a plurality of computers executing an operation process; and
   a managing computer connected with said plurality of computers;
   wherein said managing computer comprises:
      an acquiring device for acquiring log information and event information from among a plurality of computers connected via a network to each other into a common database, said log information indicating as to whether or not an execution of an operation process is carried out under normal condition, and said event information indicating whether or not an execution of an operation process is carried out under normal condition;
      a data controller for storing into said common database of said managing computer, operation definition information used to define a schedule of process operations executed in said plurality of computers in relation to said log information and said event information acquired by said acquiring device; and
      a display device for displaying said operation definition information in relation to event information related to a process operation defined by said operation definition information with reference to the information stored in said common database of said managing computer.

2. A computer system according to claim 1,
   wherein one of said plurality of computers further comprises:
      a normalizing element for normalizing log information and event information with respect to a process operation executed in said one computer into a normalized format; and
      an outputting process for outputting said log information and said event information normalized in said one computer.

3. A computer system according to claim 2,
   wherein each of said log information and said event information respectively owns a tag indicative of said log information and a tag representative of said event information.

4. A computer system according to claim 1, said managing computer further comprising:
   an selecting device to select information displayed on said display device.

5. A computer system according to claim 4, said managing computer further comprising:
   a display control device to control information displayed on said display device based on the information selected by said selecting device.

6. A computer system according to claim 1, wherein the log information indicates whether the execution of the operation process is carried out under the normal condition or an error condition.

7. A computer system according to claim 1, wherein the event information indicates whether the execution of the operation process is carried out under the normal condition or an error condition.

8. A computer system according to claim 1, wherein at least one of the plurality of computers includes an operation execution element to receive operation definition information from the managing computer, the operation execution element comprising a job execution control unit, a power supply control unit, and a print execution control unit to execute together administrative operations defined by the operation definition information.

9. A computer system comprising:
   a plurality of computers; and
   a managing computer connected with said plurality of computers by a network;
   wherein said managing computer comprises:
      an acquiring device for acquiring log information and event information from among the plurality of computers connected via the network to each other into a common database, said log information indicating whether an execution of a job operation is carried out under a normal condition or an error condition, and said event information indicating whether an execution of a job operation is carried out under the normal condition or the error condition;
      a data controller for storing into said common database of said managing computer, operation definition information used to define a schedule of job operations executed in said plurality of computers in relation to said log information and said event information acquired by said acquiring device;

a display device for displaying said operation definition information in relation to event information related to a job operation defined by said operation definition information with reference to the information stored in said common database of said managing computer; and a selecting device to select information displayed on said display device.

10. A computer system according to claim 9, wherein the managing computer further comprises a display control device to control information displayed on said display device based on the information selected by said selecting device.

11. A computer system according to claim 9, wherein one of said plurality of computers further comprises:

a normalizing element for normalizing log information and event information with respect to a job operation executed in said one computer into a normalized format; and an outputting process for outputting said log information and said event information normalized in said one computer.

12. A computer system according to claim 9, wherein each of said log information and said event information respectively owns a tag indicative of said log information and a tag representative of said event information.

13. A computer system according to claim 9, wherein at least one of the plurality of computers includes an operation execution element to receive operation definition information from the managing computer, the operation execution element comprising a job execution control unit, a power supply control unit, and a print execution control unit to execute together administrative operations defined by the operation definition information.

* * * * *